United States Patent [19]

Kinnie et al.

[11] 4,447,878

[45] May 8, 1984

[54] APPARATUS AND METHOD FOR PROVIDING BYTE AND WORD COMPATIBLE INFORMATION TRANSFERS

[75] Inventors: D. Craig Kinnie, San Jose; Richard W. Boberg, Los Gatos, both of Calif.

[73] Assignee: Intel Corporation, Santa Clara, Calif.

[21] Appl. No.: 291,450

[22] Filed: Aug. 10, 1981

Related U.S. Application Data

[63] Continuation of Ser. No. 910,103, May 30, 1978, abandoned.

[51] Int. Cl.³ .......................... G06F 13/00; G06F 7/00
[52] U.S. Cl. ........................................ 364/200; 370/67
[58] Field of Search ................ 364/200, 900; 370/62, 370/67, 85, 58; 340/825.04

[56] References Cited

U.S. PATENT DOCUMENTS

| | | | |
|---|---|---|---|
| 3,228,005 | 1/1966 | Delmege et al. | 364/200 |
| 3,581,287 | 5/1971 | Greenspan et al. | 364/200 |
| 3,588,831 | 6/1971 | Figueroa | 364/200 |
| 3,962,682 | 6/1976 | Bennett | 364/200 |
| 3,978,456 | 8/1976 | Moran | 364/200 |
| 4,074,077 | 2/1978 | Charransol | 370/58 |
| 4,075,691 | 2/1978 | Davis | 364/200 |
| 4,079,451 | 3/1978 | Woods et al. | 364/200 |
| 4,079,452 | 3/1978 | Larson | 364/200 |
| 4,109,310 | 8/1978 | England et al. | 364/200 |

*Primary Examiner*—James D. Thomas
*Assistant Examiner*—David Y. Eng
*Attorney, Agent, or Firm*—Blakely, Sokoloff, Taylor & Zafman

[57] ABSTRACT

A digital processor, memory or other digital information circuit can be made compatible in a computer system which includes both 8 or 16 bit digital users within the system. The 16 bit system and local buses are divided into an upper and lower half with each half having a separate upper and lower buffer circuit respectively. A swap byte buffer is provided for selectively coupling digital information on the upper half of the local bus to the lower half of the system bus. The lower, upper, and swap byte buffers are selectively enabled in response to a discrete command signal and in the case of memory transfers, to the least significant bit of the memory address.

10 Claims, 9 Drawing Figures

APPARATUS AND METHOD FOR PROVIDING BYTE AND WORD COMPATIBLE INFORMATION TRANSFERS

This is a continuation of application Ser. No. 910,103, filed May 30, 1978, now abandoned.

BACKGROUND OF THE INVENTION

1. Field of the Invention

The present invention relates to apparatus and methods for transferring information between a local and system bus wherein the users and peripherals connected with these busses are each characterized by differing lengths of the units of digital information processed. In particular, the present invention relates to a method of apparatus for permitting the use of both 8 and 16 bit machines in the same system.

2. Description of the Prior Art

Semiconductor microprocessors have predominantly been designed to transfer data or digital information within a microprocessor computer system, for example as between a processor and a memory, wherein the information consisted of eight-bit bytes. Thus, a large number of peripheral devices are organized and accessed in byte quantities.

However, the sophistication, power and complexity of semiconductor microprocessors continues to increase at an accelerating rate wherein many microprocessor computer systems are now based upon manipulation of quantities having a word or 16 bit lengths. Thus, many prior art eight-bit memories can no longer be accessed by central processors which assume that each memory location contains a sixteen-bit word. Therefore, a substantial number of prior art microprocessor computer systems, including peripherals, have become incompatible with newer sixteen-bit microprocessor systems now being developed and marketed. What is needed then is some means by which a computer system may be organized so as to be compatible with circuit users and peripherals based both upon byte and word length quantities.

BRIEF SUMMARY OF THE INVENTION

The present invention is a circuit for transferring digital information, having units of length of at least two magnitudes, between a first and second bus or a local and system bus respectively. The circuit comprises a first means for selectively transferring a first or lower portion of the digital information between a first or lower portion of the first and second busses. A second means is provided for selectively transferring a second or upper portion of the digital information between a second or upper portion of the first and second busses. A swap means is then provided for selectively transferring the second portion of the digital information between the second portion of the first bus and the first portion of the second bus. By this means a circuit can be devised for selectively transferring bytes and words of digital information to provide a computer organization compatible with the concurrent processing of both byte and word length digital information.

More specifically, the present invention is a circuit for selectively transferring byte and words of digital information between the local and system bus wherein the local and system bus each have a lower and upper portion. The circuit comprises a lower transceiver circuit or buffer for transferring the digital information between the lower portions of the local and system busses. An upper transceiver circuit or buffer is provided for transferring the digital information between the upper portions of the local and system busses. Finally, a swap byte transceiver circuit or buffer is included for transferring the digital information between the lower portion of a system bus and the upper portion of a local bus. In one embodiment the swap byte transceiver circuit or buffer is coupled directly between the upper portion of the local bus and the lower portion of the system bus. In another embodiment the swap byte transceivers circuit or buffer is coupled between the upper and lower portion of local bus to communicate with the lower portion of the system bus through the lower transceiver circuit or buffer.

The present invention also includes a method for transferring information between a local and system bus wherein the local and system bus each have a lower and upper portion. The method comprises the step of decoding a discrete command signal and a least significant address bit to selectively generate a plurality of chip select signals. At least one of the plurality of chip select signals is indicative of a transfer of information between the lower portion of the system bus and the upper portion of a local bus. Next, a plurality of transceiver circuits are selectively enabled to selectively transfer the information between the upper and lower portions of the local and system bus. At least one of the plurality of transceiver circuits is selectively enabled to transfer the information between the lower portion of the system bus and the upper portion of the local bus. These and the other advantages and embodiments of the present invention are best understood by viewing the drawings in light of the following Detailed Description of the Preferred Embodiments.

DETAILED DESCRIPTION OF THE PREFERRED EMBODIMENTS

The present invention is circuitry and a method for organizing digital circuitry such that the digital circuit, processor, memory or like device may access a system bus to transfer either byte or word length quantities of digital information onto and from the system bus. The 16 bit system bus is divided into two halves each consisting of 8 bit bytes. Data transceivers are provided for both the upper and lower halves of the system bus. A swap byte transceiver is similarly provided to couple the upper portion of the local bus to the lower portion of the system bus. Both the upper and lower transceivers and the swap byte transceiver are selectively enabled in response to two encoded signals: a byte high enable, BHEN, which is a discrete processor command signal, and ADRO, which may generally be regarded as the least significant bit of the system address bus. Thus, by appropriately enabling the transceivers, a full 16 bit word may be transferred or a single 8 bit word transferred on either the upper or lower halves of the system bus to the upper or lower halves of the local bus or may be switched between the upper half of the local bus and the lower half of the system bus.

The embodiment which is illustrated is assumed to be a memory card having a memory bank divided into low or even address bytes and high or odd address bytes. Thus, when the term "local bus" is used it is intended to mean the data bus which is incorporated on the memory card and upon which digital information is transferred between the memory and the memory card transceivers. Similarly, the term "system bus" is taken to mean the object bus to which the transceivers convey or receive digital information. It is entirely within the scope of the present invention that what is termed herein as the system bus may not have a plurality of peripherals or users attached thereto and may instead have a single processor which accesses a single memory bank through transceivers organized according to the present invention. On the other hand, it is further to be understood that what is termed herein as a local bus need not communicate with a memory bank but may communicate with a processor of any type known to the art, such as a central processor, a dedicated processor, an input/output processor, and subprocessing circuitry such as a direct memory access controller. Thus, the data transceivers of the present invention as illustrated in the FIGURES may in fact permit a processor to communicate with a true system bus in which case the local bus is a processor local bus. The particular embodiment which is illustrated is not taken to limit or restrict the scope of the present invention but is only provided for the purpose of clarifying the nature of the present invention by presenting a single illustrated embodiment.

Figure 1A:
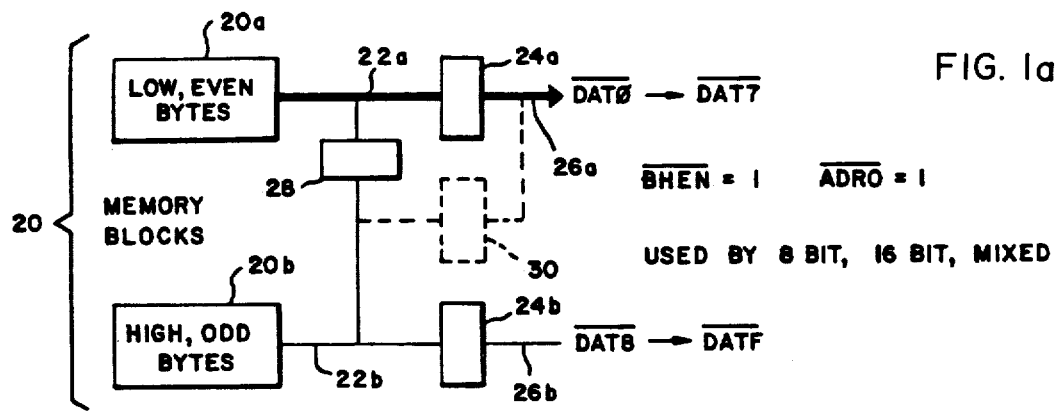
FIGS. 1a through 1d are diagrammatic illustrations of the operation of the present invention when used to read from a memory.

The circuitry and methodology of the present invention may be better understood by referring to FIGS. 1a through 1d which symbolically represent a memory/read operation. In FIG. 1a memory bank 20 is comprised of a low or even bank 20a for storage of bytes having an even address and a high or odd bank 20b for storage of bytes having an odd address. An 8 bit data line 22a provides a bidirectional bus for memory 20a. Similarly, 8 bit bidirectional data bus 22b provides the same function for memory 20b. Together, busses 22a and 22b form a 16 bit data bus characterized by having a lower or first portion 22a and an upper or second portion 22b. Again, although the presently illustrated embodiment shows a local bus as being a data bus, it must be expressly understood that digital information, other than data, may be transferred over the busses of the present invention.

Data bus 22a is coupled to transceiver or buffer 24a. Similarly, bus 22b is coupled to transceiver or buffer 24b. Transceiver 24a is also coupled to the first or lower portion of a system bus 26a, $\overline{\text{DAT0-DAT7}}$. Similarly, transceiver 24b is coupled to the upper or second portion of system bus 26b, $\overline{\text{DAT8-DATF}}$. FIGS. 1a through 1d, and 2a through 2d each illustrate two possible embodiments of the present invention. In one embodiment a byte swap transceiver 28 is coupled directly between busses 22a and 22b. In this embodiment bytes are transferred between memory bank 20b and system bus 26a through transceiver 28 and transceiver 24a. In another embodiment, a transceiver 30 is directly coupled between bus 22b and 26a thereby providing direct communication between the high memory bytes and the lower portion of the system bus. Each of the FIGS. 1b through 1d and 2a through 2d are similarly configured and numbered.

Figure 1B:
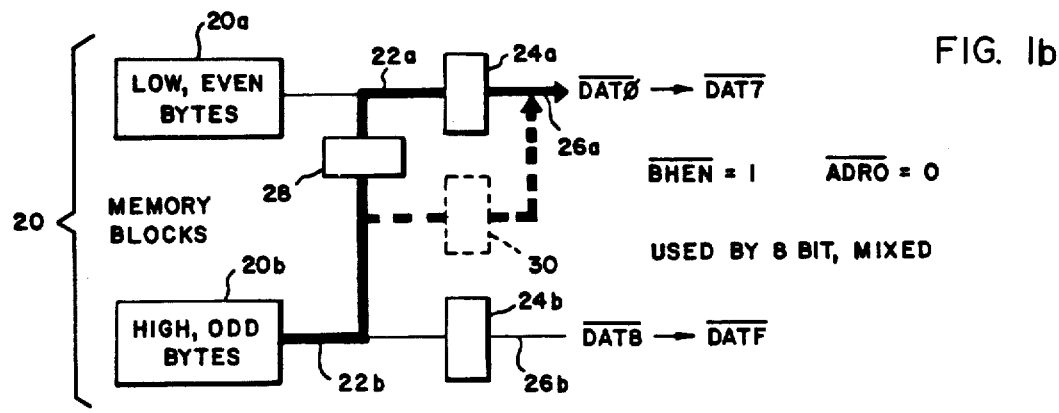

In an 8 bit system only the lower eight lines 26a of the system bus will be used for transferring digital information. Therefore, both even and odd bytes are accessed through lower portion 26a of the system bus. In the case where even bytes are accessed, encoded signals $\overline{\text{BHEN}}$ and $\overline{\text{ADR0}}$ are both true, transceiver 24a is enabled by means described below and the information is transferred from bus 22a to 26a. In the case where an odd address is accessed, the encoded signal $\overline{\text{BHEN}}$ is true and $\overline{\text{ADR0}}$ is false as illustrated in FIG. 1b. In one embodiment transceiver 30 is enabled thereby allowing transfer of the odd byte digital information directly from bus 22b to 26a. In another embodiment transceivers 28 and 24a are both enabled to transfer the odd byte information from bus 22b to bus 22a and then to bus 26a.

Figure 1C:
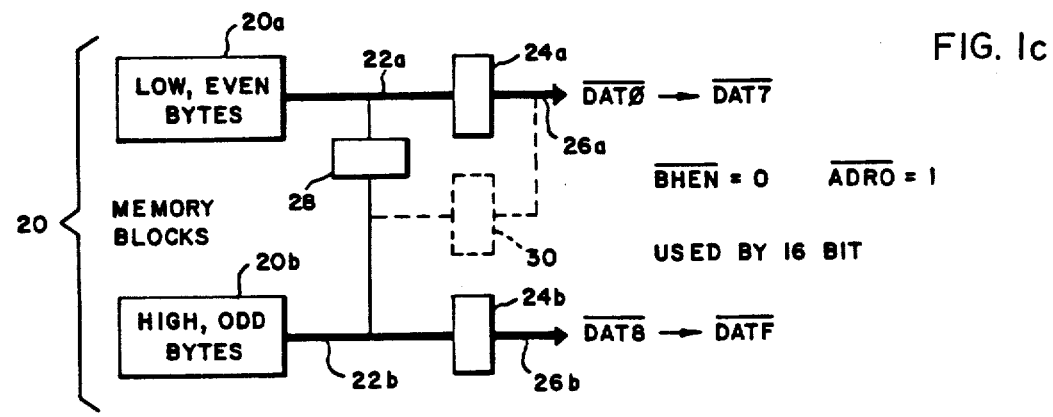

In a 16 bit system, a 16 bit word may be simultaneously accessed from the even and odd addresses by providing the encoded signals $\overline{\text{BHEN}}$ false and $\overline{\text{ADR0}}$ true to enable both transceivers 24a and 24b. The even address byte is transferred on bus 22a to 26a while the odd address byte is transferred on bus 22b to 26b as illustrated in FIG. 1c.

Figure 1D:
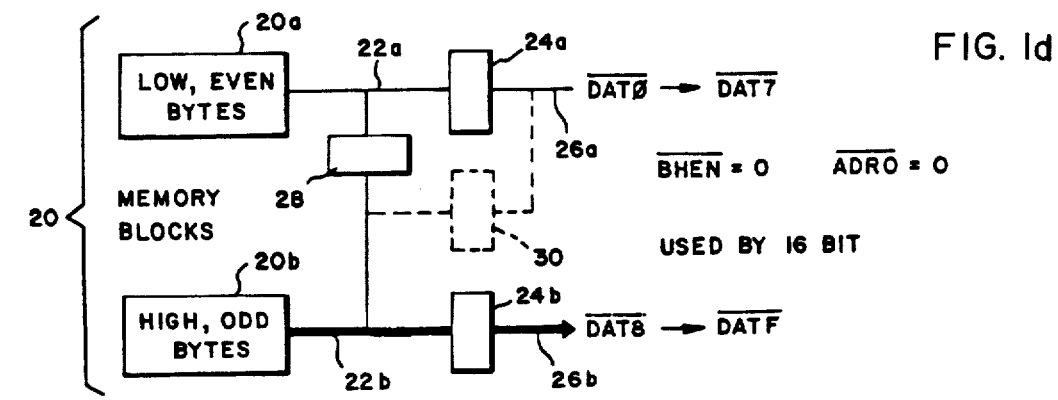
Figure 2A:
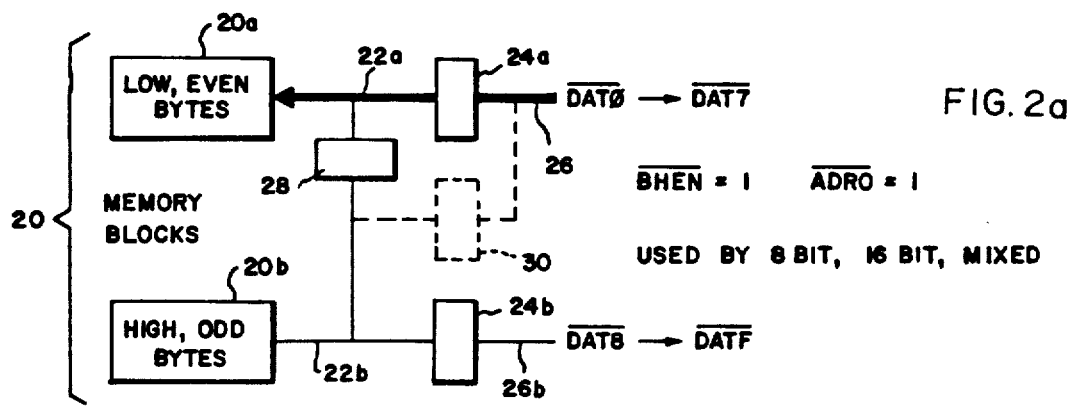
FIGS. 2a through 2d are diagrammatic illustrations using the present invention to write into a memory.
Figure 2B:
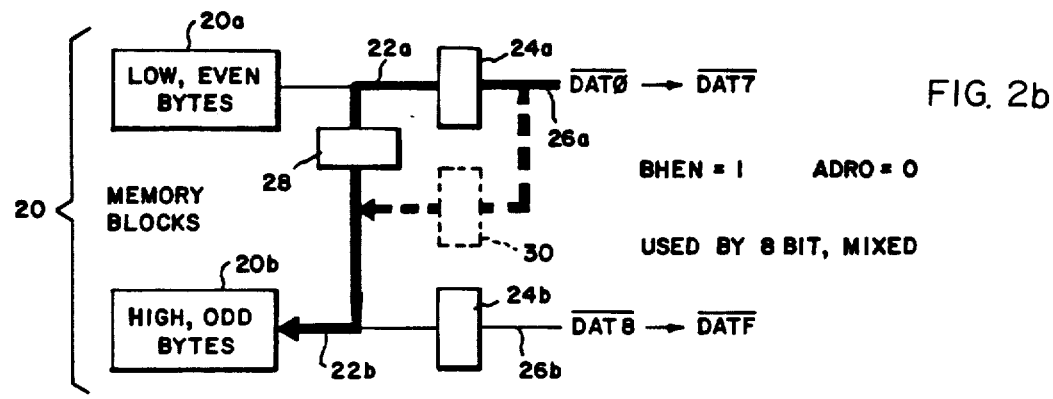
Figure 2C:
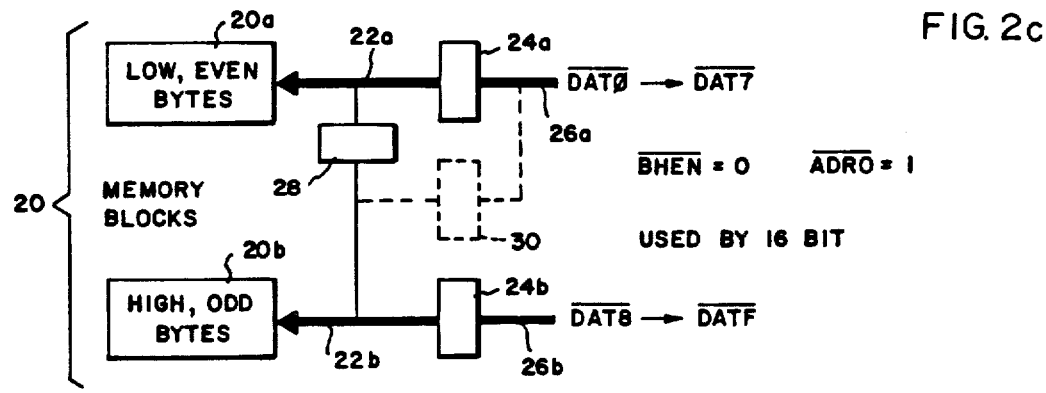
Figure 2D:
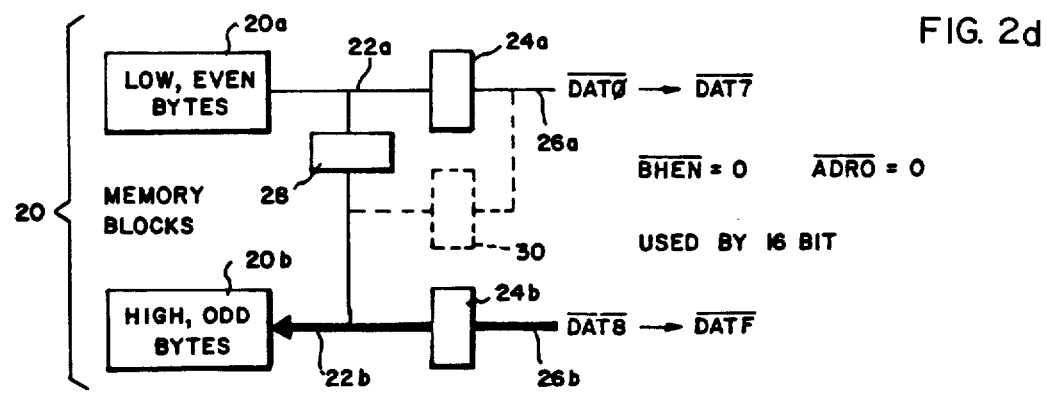

It is also possible in a 16 bit system to address 16 bit words which begin on odd addresses by using two transfer cycles. The odd address byte is accessed as illustrated in FIG. 1d by the encoded signals $\overline{\text{BHEN}}$ and $\overline{\text{ADR0}}$ both false thereby transferring the information on busses 22b and 26b. The even address byte may then be accessed by providing the encoded signals to enable transceiver 24a as illustrated in FIG. 1a.

A memory write operation proceeds in the identical manner with the same coding as can be appreciated by viewing FIGS. 2a through 2d. The transfer of digital information between the upper and lower halves of the local and system busses is identical with respect to both write and read operations with the exception that the direction of data flow is reversed. Reversal is achieved by coupling an appropriate data transmit or receive signal, DT/R, to each of the transceivers as illustrated and discussed below. The memory write operations are distinguished from the memory read operations by selectively generating a conventional memory read or memory write command signal from the processor or other controlling circuitry.

Figure 3:
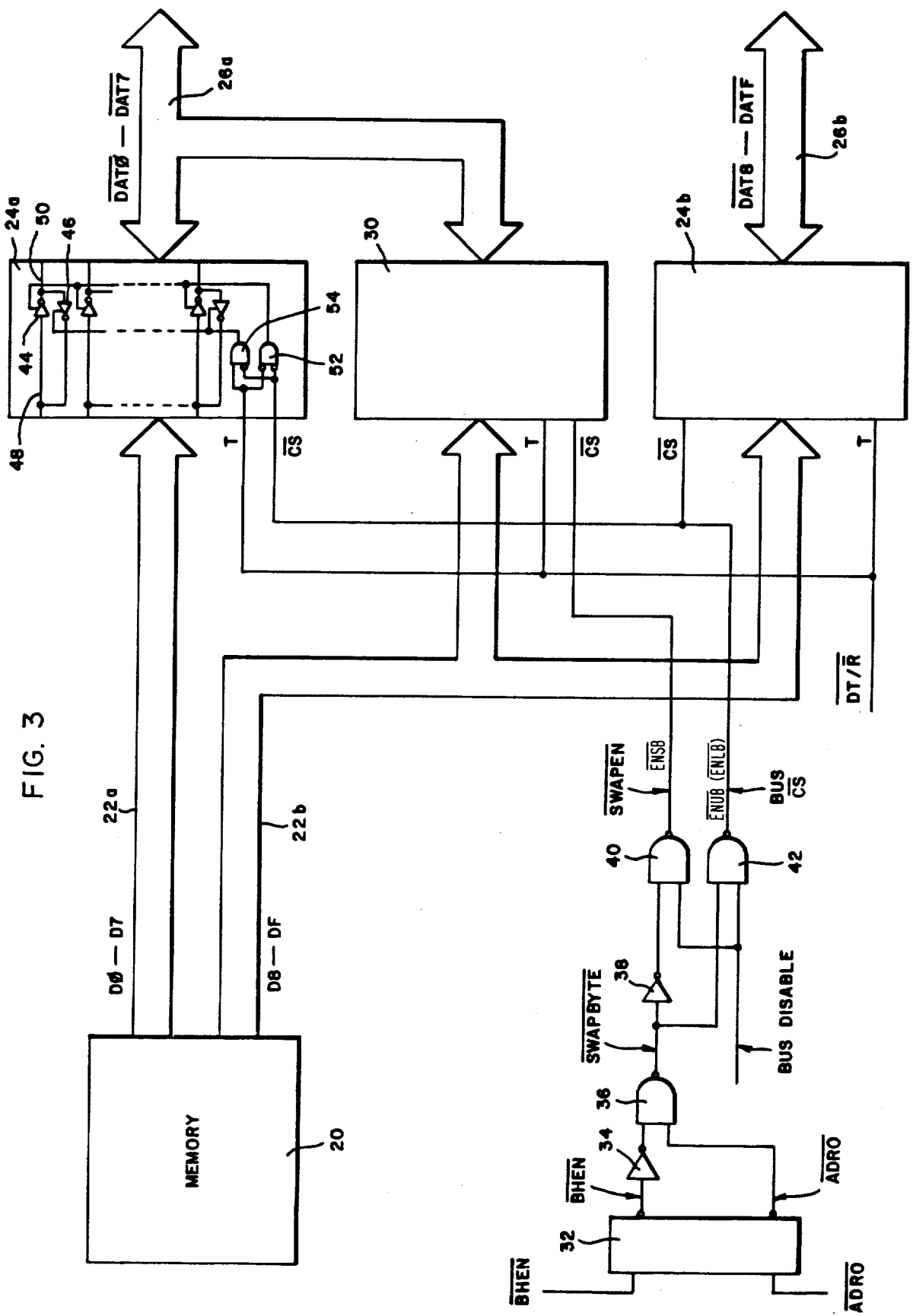
FIG. 3 shows in simplified form one means for providing the coded chip select signals.

One means by which the plurality of transceivers of the present invention may be selectively enabled is illustrated in detail in FIG. 3. The system signals, byte high enable, $\overline{\text{BHEN}}$ and the least significant bit of the address bus $\overline{\text{ADR0}}$ are buffered through a conventional inverting buffer 32 which serves to isolate and buffer the system signals from the internal circuitry of the memory card. The output, BHEN, of conventional buffer 32 is then inverted by inverter 34 whose output in turn is coupled to one input of AND gate 36. The other output of buffer 32, ADRO0, is coupled directly to the other input of NAND gate 36. The output of NAND gate 36 is the signal $\overline{\text{SWAP BYTE}}$. As can be confirmed by comparison with FIGS. 1b and 2b $\overline{\text{SWAP BYTE}}$ is active low whenever $\overline{\text{ADR0}}$ is false and $\overline{\text{BHEN}}$ is true. $\overline{\text{SWAP BYTE}}$ is then inverted by inverter 38 and coupled to one input of NAND gate 40. The other input of NAND gate 40 is coupled to the local control signal $\overline{\text{BUS DISABLE}}$. $\overline{\text{BUS DISABLE}}$ is an internal signal generated by the memory card in a conventional means to appropriately enable and disable transceivers 24a, 24b and 28 or 30 consistent with the timing and control to which memory 20 is subjected. $\overline{\text{BUS DISABLE}}$ and $\overline{\text{SWAP BYTE}}$ are each coupled to the inputs of NAND gate 42. The output of NAND gate 42 is coupled to the chip select input, $\overline{CS}$, of transceivers 24a and 24b. The output of NAND gate 40 is the signal, $\overline{SWAP\ EN}$ which is coupled to the $\overline{CS}$ input of transceiver 30.

FIG. 3 is specifically directed to that embodiment illustrated in FIGS. 1a through 1d, and 2a through 2d in which the transceiver is coupled directly between bus 22b and 26a. The truth table for both embodiments is listed below in TABLE 1.

TABLE 1

| BUS CONTROL LINES | | TRANSCEIVER CONTROL | | | MEMORY BLOCK CHIP SELECT | |
|---|---|---|---|---|---|---|
| $\overline{BHEN}$ | ADR0 | LOWER X'TR ENABLE ENLB | SWAP EN ENSB | UPPER X'TR ENABLE ENUB | LOWER CSLB | UPPER CSUB |
| 1 | 1 | 1 | 0 | X | 1 | 0 |
| 1 | 0 | 1(0)* | 1 | 0 | 0 | 1 |
| 0 | 1 | 1 | 0 | 1 | 1 | 1 |
| 0 | 0 | X | 0 | 1 | 0 | 1 |

X = Don't Care

ENLB = 1 or (ENLB = $\overline{ENSB}$)*

ENSB = $\overline{BHEN}$ · ADR0

ENUB = $\overline{ENSB}$ or BHEN

CSLB = $\overline{ADR0}$

CSUB = BHEN + ADR0

*Alternate SWAP transceiver 30 configuration.

Appropriate logic circuitry for implementing that embodiment wherein transceiver 28 is employed can easily be devised according to the teachings of the present invention.

The internal circuitry of transceiver 24a in simplified form is diagrammatically illustrated in FIG. 3. Each of the bidirectional bus lines is coupled to a pair of conventional tristate inverters 44 and 46. Consider, for example, the line $\overline{DAT0}$. Information presented at terminal 48 is coupled to tristate inverter 44, inverted and communicated to terminal 50. Similarly, information being transferred into the memory card is coupled through tristate inverter 46 from terminal 50, which is now an input, to terminal 48, as an output. Output inverter 44 is tristated by AND gate 52 while input inverter 46 is tristated by AND gate 54. The local bus control signal DT/$\overline{R}$ is coupled to the transmit or T inputs of each of the transceivers 24a, 24b, 28 or 30. Thus, when $\overline{CS}$ is active low, the output inverters will be enabled when the T input is low and the input inverters enable when the T input is high. Otherwise, each of the bus lines in lower portion 26a will be tristated or set in an high impedance state.

Each of transceivers 24a, 24b, 28 or 30 are identically configured. Therefore, the don't care states as listed in TABLE 1 above, allow transceivers 24a and 24b to be enabled and disenabled in an identical fashion in the embodiment which utilizes transceiver 30 as illustrated in FIG. 3. The output of NAND gate 40, $\overline{SWAP\ EN}$ only goes active low to enable transceiver 30 when $\overline{BHEN}$ is true and $\overline{ADR0}$ is false as indicated in TABLE 1. Similarly, by conventional decoding $\overline{BHEN}$ and $\overline{ADR0}$ can be provided as chip select signals for the lower and upper halves 20a and 20b respectively of memory 20 in the manner also illustrated in TABLE 1.

Thus, by coupling a memory 20 to a system bus having lower and upper portions 26a and 26b respectively, as illustrated in FIG. 3 the memory may be accessed either as 8 bit or 16 bit memory according to two encoded signals such that the memory may be totally compatible in a computer system having both 8 and 16 bit processors or peripherals. By using the least significant bit of the address bus as the lower byte enable, and providing a separate byte high enable signal, the encoding system of the present invention may also be made compatible, as illustrated herein, with the conventional 8 bit system wherein ADR0 is typically used as an enabling signal.

It must be understood that many modifications and alternations may be made to the illustrated embodiment while still remaining within the spirit and scope of the present invention. For example, although the discussion has been in terms of an 8 and 16 bit duality, the invention may be employed with equal ease in systems having other dualities such as 16-bit and 32-bit systems. Further, although the present invention has generally been discussed as involving the transfer of digital information between a memory or peripheral and processor, the methodology and apparatus of the present invention to be equally advantageous in any situation involving the transfer of digital information between two or more busses having distinguishable portions.

We claim:

1. A circuit for bidirectionally and selectively transferring digital information between at least a first and second bus comprising:
   a first means for bidirectionally, and selectively transferring a first portion of said digital information between a first portion of said first and second buses, said first means coupled to said first portion of said first and second buses;
   second means for bidirectionally and selectively transferring a second portion of said digital information between a second portion of said first and second buses, said second means coupled to said second portion of said first and second buses; and
   swap means for bidirectionally and selectively transferring said second portion of said digital information between said first portion of said second bus and said second portion of said first bus, said swap means coupled between said second portion of said first bus and said first portion of said second bus.

2. The circuit of claim 1 wherein said first means, second means, and swap means are selectively enabled by an enabling signal and one signal communicated on said second bus.

3. The circuit of claim 2 wherein said one signal is the lowest order address signal on said second bus.

4. The circuit of claim 1 wherein said swap means is coupled between said first and second portions of said first bus and is coupled to said first means to transfer said second portion of said digital information therethrough between said first portion of said second bus and said second portion of said first bus.

5. The circuit of claim 1 wherein said first portion of said digital information is an eight bit byte and wherein said second portion of said digital information is an eight bit byte.

6. A circuit for bidirectionally and selectively transferring digital information between a local and system bus, each said local and system bus having lower and upper portions, comprising:
- a lower transceiver circuit and buffer for bidirectionally and selectively transferring said digital information between said lower portions of said local and system buses, said lower transceiver circuit coupled to said lower portions of said local and system buses;
- an upper transceiver circuit and buffer for bidirectionally and selectively transferring said digital information between said upper portions of said local and system buses, said upper transceiver circuit coupled to said upper portions of said local and system buses; and
- a swap byte transceiver circuit and buffer for bidirectionally and selectively transferring said digital information between said lower portion of said system bus and said upper portion of said local bus, said swap byte transceiver coupled between said lower portion of said system bus and said upper portion of said local bus.

7. The circuit of claim 6 wherein said lower, upper and swap byte transceiver circuits and buffers are selectively enabled in response to an external, discrete command signal, BHEN, and in response to the least significant bit, ADR0, on an address bus.

8. A method for bidirectionally transferring information on and between a local and system bus, each said local and system bus having a lower and upper portion, comprising the steps of:
- decoding a discrete command signal, BHEN, and a least significant address bit, ADR0, on one of said system or local buses to selectively generate a plurality of chip select signals, at least one of said plurality of chip select signals being indicative of a transfer of said information between said lower portion of said system bus and said upper portion of said local bus; and
- selectively enabling a plurality of transceiver circuits by said at least one chip select signal to selectively and bidirectionally transfer said information between said upper and lower portions of said local and system bus, at least one of said plurality of transceiver circuits being selectively enabled to perform said transfer of said information between said lower portion of said system bus and said upper portion of said local bus and to bidirectionally transfer information on said upper portion of said local bus and on said lower portion of said system bus, said information on said upper portion of said local bus being transferred to said lower portion of said system bus when transfer is from said local bus to said system bus, and said information on said lower portion of said system bus being transferred to said upper portion of said local bus when transfer is from said system bus to said local bus between said upper portion of said local bus and said lower portion of said system bus,
- whereby said system bus can permit compatible transfers in both byte and word quantity lengths.

9. The method of claim 8 wherein said at least one transceiver is coupled directly between said upper portion of said local bus and said lower portion of said system bus.

10. The method of claim 8 wherein said at least one transceiver is coupled between said upper and lower portions of said local bus to communicate with said lower portion of said system bus through a transceiver coupled directly between said lower portions of said local and system bus.